Oct. 26, 1971     C. VAN DER LELY ET AL     3,615,055

SPREADING IMPLEMENTS

Filed Dec. 20, 1968     2 Sheets-Sheet 1

INVENTORS
CORNELIS VAN DER LELY
ARY VAN DER LELY
by Mason, Mason & Albright
Attorneys

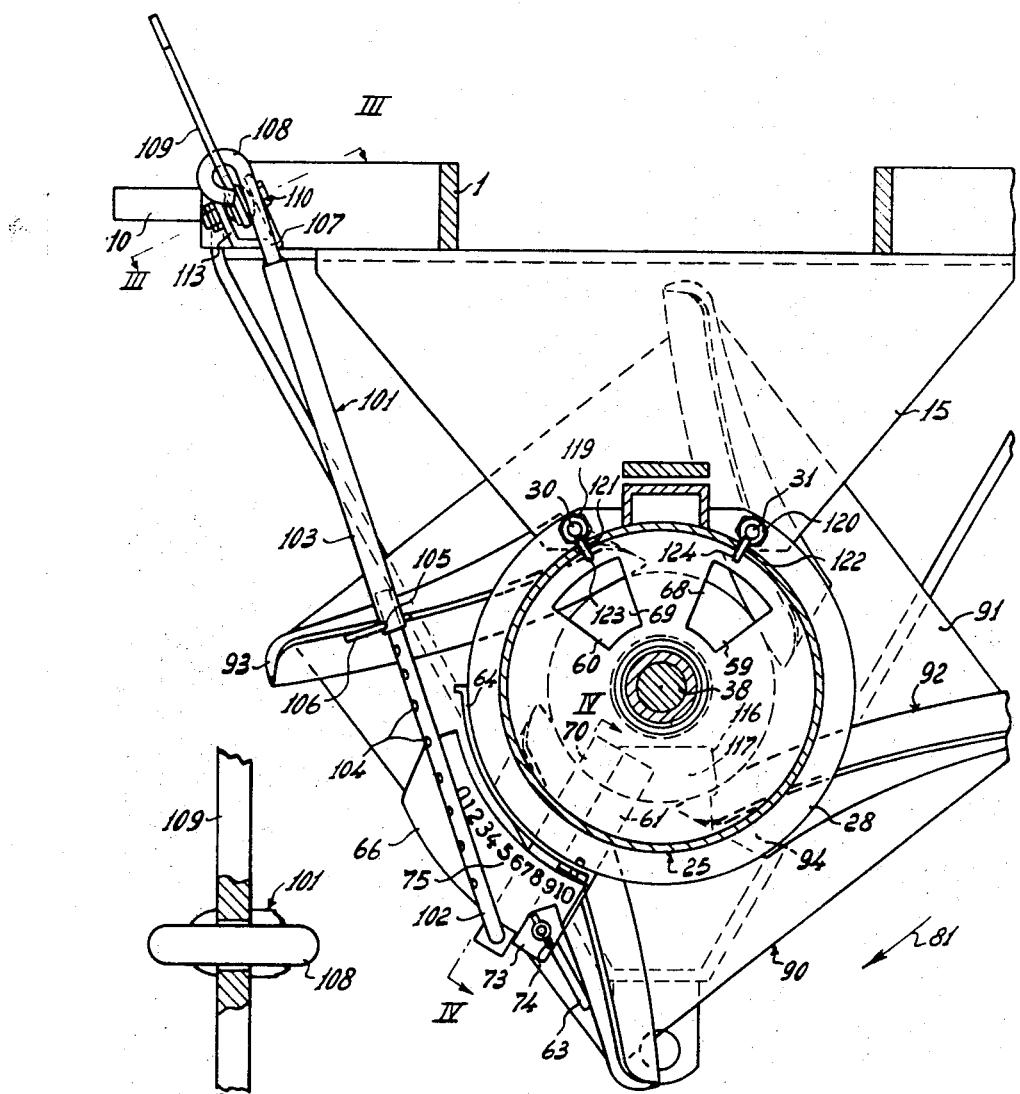
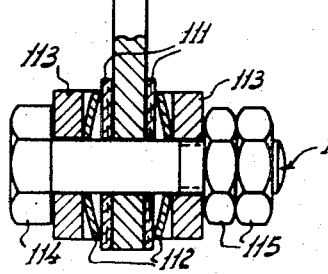
FIG. 2
FIG. 3

United States Patent Office 3,615,055
Patented Oct. 26, 1971

3,615,055
SPREADING IMPLEMENTS
Cornelis van der Lely, 7 Bruschenrain, Zug, Switzerland, and Ary van der Lely, 10 Weverskade, Maasland, Netherlands
Filed Dec. 20, 1968, Ser. No. 785,497
Claims priority, application Netherlands, Dec. 27, 1967, 6717659
Int. Cl. A01c 17/00
U.S. Cl. 239—665    17 Claims

ABSTRACT OF THE DISCLOSURE

This invention relates to spreading implements comprising a frame movable over the ground, a container for material to be spread, a spreading member, at least one outlet port through which material from the container can reach the spreading member and a flow control member movable relative to one or more outlet ports to govern the open area of the latter and adjusting or setting mechanism for said flow control member. The flow control includes an adjusting mechanism which can be manually moved simply and quickly to shut off flow or to set the flow of material to a pre-selected amount.

---

According to the invention, there is provided a spreading implement of the kind set forth, wherein the flow control member and the adjusting or setting mechanism are displaceably clamped relative to the frame, or to parts that are normally immovable with respect to the frame, the flow control member being adjustable in position only by manually displacing at least part of the adjusting or setting mechanism relative to the frame or to said parts against the opposition of the clamp.

Figure 1:
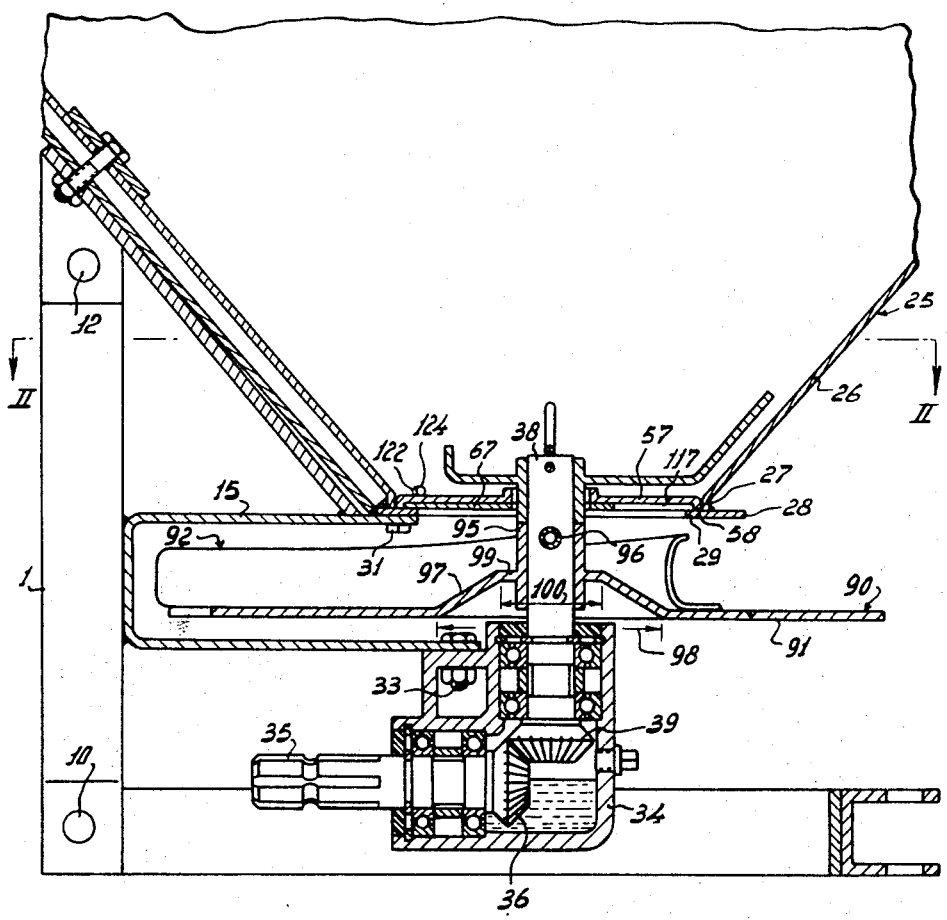
Figure 4:
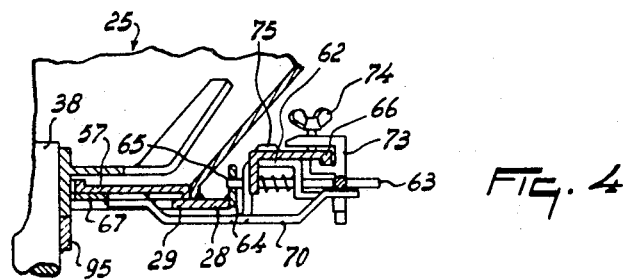

For a better understanding of the invention, and to show how the same may be carried into effect, reference will now be made, by way of example, to the accompanying drawings, in which:

FIG. 1 is a sectional side elevation of a spreading implement in accordance with the invention, FIG. 2 is a section taken on the line II—II of FIG. 1, FIG. 3 is a section, to an enlarged scale, taken on the line III—III in FIG. 2, and FIG. 4 is a section taken on the line IV—IV in FIG. 2.

Referring to the drawings, the spreading implement which is illustrated has a frame 1 a generally upright portion of which is provided at its foot with horizontally aligned pins 10 and at its top with an aperture 12. The pins 10 and aperture 12 are intended to co-operate, in a generally known manner, with the lower lifting links, and the upper adjustable lifting link, respectively of a three-point lifting device or hitch carried by an agricultural tractor or other vehicle which supports the implement for movement over the ground during transport and operation of the implement. The frame 1 also supports a container for material to be spread, the container taking the form of an inverted frusto-conical hopper 25 whose conical portion 26 is formed around its lowermost edge with a short cylindrical rim 27. An annulus 28 is secured to the lowermost edge of the rim 27 in such a way that, as can be seen in FIG. 1 of the drawings, part of said annulus is disposed outwardly beyond the rim 27 while part thereof is disposed inwardly from said rim. The part of the annulus 28 which is disposed inwardly of the rim 27 affords a supporting lip 29. Bolts 30 and 31 (FIGS. 1 and 2) are employed to fasten both the hopper 25 and the annulus 28 to a profiled frame plate 15 which forms a part of the frame 1. A gear box 34 which lies beneath the hopper 25 is also secured to the frame plate 15 by bolts 33, said gear box 34 having a rotary input shaft 35 whose leading splined or otherwise keyed end projects forwardly from said gear box 34 in the intended direction of operative travel of the implement so that it may be placed in driven connection with the power take-off shaft of a supporting tractor or other vehicle with the aid of an intermediate telescopic transmission shaft (not shown) having universal joints at its opposite ends. The end of the shaft 35 that is located inside the gear box 34 carries a bevel pinion 36 whose teeth are in driving mesh with those of a bevel pinion 39 secured to the lowermost end of a substantially vertical rotary output shaft 38 whose uppermost end projects into the interior of the hopper 25.

A spreading member which is generally indicated by the reference 90 is also secured to the shaft 38, said spreading member comprising a substantially square and substantially horizontal disposed plate 91 whose uppermost surface has four spreading or ejecting blades 92 secured to it in such a way that the outermost ends 93 of said blades 92 are located very close to the four corners of the plate 91. The blades 92 are gently curved in such a way that their inner, or root, ends 94 extend substantially tangentially with respect to a circle centered upon the axis of rotation which is afforded by the shaft 38. The spreading member 90 has a central sleeve or hub 95 which is releasably secured to the shaft 38 with the aid of a transverse pin 96. The plate 91 merges centrally into the foot of a frusto-conical plate 97 which has a maximum diameter 98 that is about 5 times the diameter of the shaft 38. It will be noted that the inner, or root, ends 94 of the blades 92 are disposed immediately alongside the foot of the frusto-conical plate 97. The top of the plate 97 is integrally connected to the sleeve or hub 95 by a flat annular plate 99 that is disposed perpendicular to the axis of rotation of the shaft 38, said flat annular plate 99 having a maximum diameter 100 which is about twice that of the shaft 38.

The hopper 25 has a movable wall portion in the form of an annular bottom 57 formed with a downwardly bent-over rim 58 whose lowermost edge bears downwardly against the supporting lip 29. The annular bottom 57 is angularly adjustable about the axis of rotation of the shaft 38 and is formed with two outlet ports 59 and 60 (FIG. 2). A strip-shaped setting arm 61 projects from the bottom 57 and is provided towards its outermost end with an inverted U-shaped portion 62 (FIG. 4) which accommodates a spring-loaded pin 63 whose tip can be entered in any chosen one of a row of holes 65 formed in a curved strip 64 that is fastened to the outermost edge of the annulus 28 in such a way that its center of curvature substantially coincides with the axis of rotation of the shaft 38. The inverted U-shaped portion 62 of the setting arm 61 also carries a reference member 66 the greater part of which is horizontally disposed and of a curved configuration such that its center of curvature substantially coincides with the axis of rotation of the shaft 38. A flow control member in the form of a substantially horizontal annular disc 67 is located immediately beneath the bottom 57 of the hopper 25 in such a way as to have an outermost region thereof supported from beneath by the lip 29 while surrounded by the rim 58 of said bottom 57. The disc 67 is formed with two outlets 68 and 69 that can co-operate with the outlet ports 59 and 60 in more or less registering relationship. As seen in FIG. 2 of the drawings, the outlets 68 and 69 are in complete register with the ports 59 and 60 respectively.

The disc 67 is provided with a projecting setting arm 70 (FIGS. 2 and 4) the outermost end of which is pivotally connected to one end of a coupling member that is generally indicated by the reference 101. The coupling member 101 includes a rod 102 and a tube 103 which are arranged in relatively telescopic relationship, the end of the rod 102 which is remote from the tube 103 being engaged with the setting arm 70. The rod 102 is formed with a row of holes 104, the longitudinal axis of each hole 104 being inclined at about 45° to the horizontal. The tube 103, on the other hand, is formed adjacent its mouth with a pair of opposite holes 105 that are so arranged that a straight line passing through the centers of both holes would also be inclined at an angle of about 45° to the horizontal. A retaining pin 106 can be entered through the two holes 105 and any chosen hole 104 to maintain the rod 102 in a corresponding setting of extension relative to the tube 103. The end of the tube 103 that is remote from the rod 102 carries a short rod 107 formed at its free end with an eye 108. The eye 108 is entered through a hole in a control arm 109 that is turnable about a horizontal pivot bolt 110 (FIGS. 2 and 3), the connection of the eye 108 to the arm 109 being spaced some distance above the bolt 110. Two lugs 113 project from the frame 1 and the substantially horizontal pivot bolt 110 is entered through aligned holes formed in said lugs. As can be seen best in FIG. 3 of the drawings, the arm 109 is spaced midway between the two lugs 113 and its opposite sides are contacted by fibre washers 111 mounted on the bolt 110. Cup-shaped spring washers 112 are provided between the two fibre washers 111 and the respective lugs 113. The pivot bolt 110 has a head 114 which is located at the side of one of the lugs 113 that is remote from the other lug 113 while the opposite screw-threaded end of the shank of the bolt 110 carries two relatively lockable nuts 115 that flank the outer side of the lug 113 that is remote from the lug 113 engaged by the bolt head 114.

The reference member 66 has a downwardly bent-over outer lip and a stop 73 which incorporates a pointer can be slid along said lip and retained at any chosen position therealong by tightening a wing nut 74 to clamp the stop 73 to the reference member 66. It will be seen from FIGS. 2 and 4 of the drawings that the upper surface of the reference member 66 carries a scale 75 reading from "0" to "10" and that the pointer which forms part of the stop 73 is arranged to co-operate with said scale 75. The previously mentioned bolts 30 and 31 co-operate with nuts 119 and 120 respectively, said nuts carrying laterally projecting pins 123 and 124. These pins 123 and 124 are entered through small holes 121 and 122 in the conical portion 26 of the hopper 25 in such a way that, when the implement is assembled, the ends of said pins that lie internally of the hopper 25 are disposed immediately above the annular bottom 57 thereof thus preventing said bottom from being displaced upwardly in the hopper.

In the use of the spreading implement which has been described in the spreading of granular or powdered materials such, for example, as artificial fertilisers, lime, sand, seeds and so on over the ground, the pins 10 and aperture 12 are employed to connect the frame 1 to the three-point lifting device or hitch of an agircultural tractor or other vehicle in the manner previously mentioned. The input shaft 35 is placed in driven connection with the power take-off shaft of the same tractor or other vehicle and the implement is moved over the ground with the spreading member 90 rotating about the longitudinal axis of the shaft 38, the direction of operative travel of the implement being from right to left as seen in FIG. 1 of the drawings. The spreading member 90 rotates in the direction indicated by an arrow 81 in FIG. 2 of the drawings and the material in the hopper 25 flows downwardly to the spreading member 90 by way of the more or less registering outlet ports 59 and 60 and outlets 68 and 69. The shape of the spreading member 90, and particularly the shape of its blades 92, is such that the spreading member will distribute the material over a broad strip of land in a uniform manner. The position of the strip of land upon which the material falls relative to the path of travel of the implement is dictated principally by the angular setting around the shaft 38 at which the material from the hopper 25 reaches the spreading member 90 and it will be realised that an adjustment to change the position of the strip of ground which receives the material relative to the path of travel of the implement can be made by altering the angular settings of the annular bottom 57 and annular disc 67, in common, about the axis of the shaft 38. This is effected by withdrawing the spring-loaded pin 63 from one of the holes 65 and also the pin 106 from the holes 105 and one of the holes 104. Both the setting arms 61 and 70, and the parts which are connected thereto, can then be turned, in common, about the shaft 38 until the pin 63 is in line with an alternative hole 65 in the strip 64 that corresponds to the required direction of distribution of the material. The adjustment which has just been mentioned will move the rod 102 relative to the tube 103 and, generally speaking, an alternative hole 104 will be in register with the two holes 105 so that the pin 106 can be replaced without difficulty. If an exact register between a hole 104 and the two holes 105 is not achieved, it will be realised that a small angular displacement of the control arm 109 about the pivot bolt 110 will immediately produce the degree of register required to enable the pin 106 to be replaced.

The volume of material per unit time which reaches the spreading member 90 from the hopper 25 is governed by the degree of register between the outlet ports 59 and 60 and the outlets 68 and 69 respectively. A change in the area of the outlet openings through which the material can reach the spreading member 90 is effected by turning the flow control member afforded by the annular disc 67 around the axis of the shaft 38 with respect to the annular bottom 57 of the hopper which remains unmoved. The disc 67 is turned about the shaft 38 with the aid of the setting arm 70, the stop 73 determining the degree of outlet register at any time with the pointer of said stop indicating the degree of register on the scale 75. When, as illustrated, the stop 73 is opposite the mark "10" on the scale 75, the outlets 68 and 69 are in complete register with the outlet ports 59 and 60, while, when the stop 73 is opposite the mark "0" on the scale 75, the outlets and outlet ports that have just been mentioned do not register at all so that material from the hopper 25 can no longer reach the spreading member 90. It will be appreciated that, if the stop 73 was clamped alongside, for example, the mark "5" on the scale 75, the rate of flow of material to the spreading member 90 would be about half the maximum possible rate of flow and that the flow of material could be rapidly shut off, and subsequently re-established at exactly the same value, merely by turning the setting arm 70 to a position just beyond the mark "0" on the scale 75 and subsequently turning said arm 70 back about the shaft 38 until it again made abutting contact with the stop 73. The arm 70 is moved in this way by turning the control arm 109 manually about the pivot bolt 110 and it will be noted that the zero or fully closed position of the setting arm 70 is positively established by the edge 116 (FIG. 2) of an opening 117 (FIGS. 1 and 2) formed through the disc 67 at the opposite side of the shaft 38 from the outlets 68 and 69. As the arm 70 reaches the position in which the outlets 68 and 69 are completely out of register with the outlet ports 59 and 60, the edge 116 of the opening 117 comes into contact with the edge of the setting arm 61 which arm, it will be realised from FIGS. 2 and 4 of the drawings, extends downwardly from the hopper bottom 57 through the opening 117 in the disc 67.

The adjusted position of the setting arm 70, and thus that of the disc 67 relative to the hopper bottom 57, is frictionally maintained by the spring washers 112 and fibre washers 111 which act upon the control arm 109 where the latter is pivoted around the bolt 110. The frictional resistance to displacement of the control arm 109 about the bolt 110 can be increased, or decreased, by axial displacement of the nuts 115 along the shank of the bolt 110 to draw the lugs 113 closer together or to allow them to move slightly further apart. The annular disc 67 is thus effectively clamped in a chosen position relative to the annular bottom 57 of the hopper, the frictional clamp being located remote from said disc and said bottom. However, it is within the scope of the invention to clamp the disc 67 in a chosen position relative to the hopper bottom 57 with the aid of a direct clamp interconnecting said disc 67 and the hopper 25 or its bottom 57.

Material from the hopper 25 which passes through the outlets 68 and 69 falls onto the frusto-conical plate 97 of the spreading member 90 and flows downwardly therefrom, in a uniform manner, to the inner periphery of the flat plate 91. The material can then be picked up by the inner, or root, ends 94 of the spreading or ejecting blades 92. As can be seen from FIG. 2 of the drawings, the radius of the upper end of the frusto-conical plate 97 is less than the minimum radial spacing of the outlet ports 59 and 60 and outlets 68 and 69 from the axis of the shaft 38. The radius of the foot or bottom of the frusto-conical plate 97 is, on the other hand, approximately equal to the radial spacing of the outer edges of the ports 59 and 60 and outlets 68 and 69 from the axis of the shaft 38. This arrangement facilitates uniform spreading of the material from the hopper 25.

Having thus described our invention, what we claim as new and desire to secure by Letters Patent of the United States is:

1. A spreading implement having a frame and a container supported on said frame, a spreader member rotatably mounted on said implement to receive material from said container, port means on said container for controlling the flow of material from the container to said spreader member, an adjusting mechanism connected to said port means, said adjusting mechanism being displaceably mounted on said frame with a clamp, said port means including a circular disc with ports and said disc being mounted for rotation beneath an annular bottom of said container having outlets, an annulus mounted beneath said container, said annular bottom having a turned down rim for rotation on the upper surface of said annulus, a shaft for rotating said spreader member extending through said annulus, said circular disc and said bottom.

2. A spreading implement having a frame and a container supported on said frame, a spreader member rotatably mounted on said implement to receive material from said container, an annular member mounted at the lower end of said container to support port means having two circular ported elements for controlling the flow of material from said container to said spreader member, said spreader member being mounted on a shaft extending through the center of said ported elements in said container whereby said ported elements are turnable around said shaft, adjusting means connected to said ported elements, said adjusting means being displaceably mounted and associated with friction means on said frame to turn and adjust the relative positions of said ported elements, whereby said ported elements remain frictionally biased in a chosen position about said axis.

3. A spreading implement having a frame and a container supported on said frame, a spreader member rotatably mounted on said implement to receive material from said container, port means for controlling the flow of material from the container to said spreader member, an adjusting mechanism connected to said port means, said adjusting mechanism being displaceably mounted on said frame with a clamp, said clamp including means for yieldingly opposing the manual displacement of said adjusting mechanism whereby said port means can be actuated to control the flow of material from said container, said adjusting mechanism including a control arm mounted between cup-shaped spring washers on a pivot, said washers yieldingly opposing the movements of said arm.

4. A spreading implement comprising a frame and a container with port means supported on said frame, a spreading member rotatable about a substantially vertical axis being positioned beneath said port means, said port means comprising two circular members which are turnable about said axis, each of said circular members having at least one outlet extending from adjacent the circular member's center to adjacent the circumference thereof, adjusting means connected to said port means, said adjusting means being displaceably mounted and associated with friction means on said implement for turning and adjusting the relative positions of said circular members, whereby said port means remains frictionally biased in a chosen position about said axis, said adjusting means including a control arm pivotally mounted on a substantially horizontal pivot and said control arm being connected with said ported means by a coupling rod.

5. A spreading implement as claimed in claim 4, wherein said spreading member includes a plurality of blades mounted on a plate-shaped element, said element having a center portion of frusto-conical shape positioned substantially beneath an outlet and at least, in part, in vertical alignment therewith, through which material from the container reaches said spreading member during operation so that the material initially strikes said center portion when said outlet is in any adjusted position, said blades having their root ends located adjacent the base of said center portion.

6. An implement as claimed in claim 2, wherein said adjusting mechanism is connected to a setting arm and said setting arm is operatively associated with said port means, an intermediate coupling rod coupling said setting arm with said port means.

7. An implement as claimed in claim 6, wherein said container has a movable bottom with at least one outlet and said port means includes an annular element with at least one port, said bottom and said annular element being displaceable relative to the remainder of said container.

8. An implement as claimed in claim 7, wherein said spreading member is rotatable about the same axis around which both said movable bottom and said annular element are displaceable.

9. An implement as claimed in claim 8, wherein said movable bottom has a lock whereby said bottom can be directly fixed in chosen positions relative to the remainder of said hopper.

10. An implement as claimed in claim 6, wherein the length of said coupling rod is adjustable.

11. An implement as claimed in claim 10, wherein said coupling rod is a telescopic rod mounted in a tube and transverse holes are formed in said rod and tube for the reception of a retaining pin whereby said rod can be held in a corresponding degree of extension relative to said tube.

12. An implement as claimed in claim 11, wherein the holes in said rod and tube have axes which are inclined at about 45° to the horizontal.

13. An implement as claimed in claim 6, wherein said frame has coupling members for connecting said implement to the lifting device of an agricultural tractor, said adjusting mechanism being turnable on a pivot on said frame adjacent one of said coupling members.

14. An implement as claimed in claim 2, wherein said spreading member is rotatable about a substantially vertical axis, a portion of said spreading member being positioned beneath said port means, said spreading member comprising blades mounted on a substantially horizontal plate, a portion of said plate being of frusto-conical shape.

15. An implement as claimed in claim 5, wherein the number of blades on said spreader member is equal to the number of corners of said plate-shaped element, the outermost ends of said blades being located adjacent the corners of said element.

16. An implement as claimed in claim 5, wherein the maximum radius of the frusto-conical center portion of said spreading member is approximately equal to the distance between the axis of rotation and the radially outermost point of said outlets.

17. An implement as claimed in claim 5, wherein the root ends of said blades extend substantially tangentially with respect to a circle centered on the axis of rotation of said spreading member, said root ends being adjoined to the outer periphery of said frusto-conical center portion.

References Cited

UNITED STATES PATENTS

| | | | |
|---|---|---|---|
| 1,116,477 | 1/1916 | Parrish | 239—665 |
| 2,234,343 | 3/1941 | Harrington | 239—665 |
| 2,519,243 | 8/1950 | Gjertson | 239—661 |
| 2,550,872 | 5/1951 | Shaw | 239—670 X |
| 2,687,307 | 8/1954 | Austermiller | 239—687 |
| 2,886,334 | 5/1959 | Presler | 239—683 X |
| 3,157,403 | 11/1964 | Van der Lely | 239—665 |
| 3,232,626 | 1/1966 | Polzin | 239—665 |
| 3,279,801 | 10/1966 | Meyer | 239—687 |
| 3,317,213 | 5/1967 | Van der Lely | 239—687 X |

LLOYD L. KING, Primary Examiner

J. J. LOVE, Assistant Examiner

U.S. Cl. X.R.

239—687